US008547004B2

(12) United States Patent
Eden et al.

(10) Patent No.: US 8,547,004 B2
(45) Date of Patent: Oct. 1, 2013

(54) ENCAPSULATED METAL MICROTIP MICROPLASMA DEVICES, ARRAYS AND FABRICATION METHODS

(75) Inventors: J. Gary Eden, Champaign, IL (US); Sung-Jin Park, Champaign, IL (US); JeKwon Yoon, Paju-Si (KR); Brian Chung, Bloomingdale, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 128 days.

(21) Appl. No.: 13/188,715

(22) Filed: Jul. 22, 2011

(65) Prior Publication Data

US 2012/0074830 A1    Mar. 29, 2012

Related U.S. Application Data

(60) Provisional application No. 61/367,951, filed on Jul. 27, 2010.

(51) Int. Cl.
*H01J 61/04* (2006.01)
*H01J 17/49* (2012.01)

(52) U.S. Cl.
USPC .............. 313/267; 313/355; 313/582; 445/25

(58) Field of Classification Search
USPC .......................................... 313/267, 355, 582
See application file for complete search history.

(56) References Cited

U.S. PATENT DOCUMENTS

| 3,551,303 A | 12/1970 | Suzuki et al. |
| 4,988,918 A | 1/1991 | Mori et al. |
| 5,164,633 A | 11/1992 | Kim et al. |
| 5,441,627 A * | 8/1995 | Kato et al. ...................... 205/77 |

(Continued)

FOREIGN PATENT DOCUMENTS

| EP | 2004211116 | 7/2004 |
| EP | 2005256071 | 9/2005 |

(Continued)

OTHER PUBLICATIONS

White, A.D., "New Hollow Cathode Glow Discharge", *Journal of Applied Physics,* May 1959, vol. 30: No. 5.
Masuda, Hideki, et al., "Ordered Metal Nanohol Arrays Made by a Two-Step Replication of Honeycomb Structures of Anodic Alumina", *American Association for the Advancement of Science,* Jun. 9, 1995, vol. 268.
Stark, Robert H., et al., "Direct Current High-Pressure Glow Discharges", *Journal of Applied Physics,* Feb. 15, 1999, vol. 85: No. 4.
Stark, Robert, H., et al., "Direct Current Glow Discharges in Atmospheric Air", *Applied Physics Letters,* Jun. 21, 1999, vol. 74: No. 25.
Park, S.J., et al., "Flexible Microdischarge Arrays: Metal/Polymer Devices", *Applied Physics Letters,* Jul. 10, 2000, vol. 77: No. 2.
Kim, K.S., et al.. "Self-Patterned Aluminium Interconnects and Ring Electrodes for Arrays of Microcavity Plasma Devices Encapsulated in $Al_2O_3$", *Journal of Physics D: Applied Physics,* 2008, vol. 41.

(Continued)

*Primary Examiner* — Sikha Roy
(74) *Attorney, Agent, or Firm* — Greer, Burns & Crain Ltd.

(57) ABSTRACT

An embodiment of the invention is a microtip microplasma device having a first metal microtip opposing a second metal microtip with a gap therebetween. The first and second metal microtips are encapsulated in metal oxide that electrically isolates and physically connects the first and second metal microtips. In preferred devices, the first and second metal microtips and metal oxide comprise a monolithic, unitary structure. Arrays can be flexible, can be arranged in stacks, and can be formed into cylinders, for example, for gas and liquid processing devices, air filters and other applications. A preferred method of to forming an array of microtip microplasma devices provides a metal mesh with an array of micro openings therein. Electrode areas of the metal mesh are masked leaving planned connecting metal oxide areas of the metal mesh unmasked. Planned connecting metal oxide areas are electrochemically etched to convert the planned connecting metal oxide areas to metal oxide that encapsulates opposing metal microtips therein. The mask is removed. The electrode areas are electrochemically etched to encapsulate the electrode areas in metal oxide.

22 Claims, 14 Drawing Sheets

(56) References Cited

U.S. PATENT DOCUMENTS

| | | | |
|---|---|---|---|
| 5,792,517 | A | 8/1998 | Takeuchi et al. |
| 5,841,219 | A | 11/1998 | Sadwick et al. |
| 6,051,923 | A | 4/2000 | Pong |
| 6,194,833 | B1 | 2/2001 | DeTemple et al. |
| 6,541,915 | B2 | 4/2003 | Eden et al. |
| 6,577,058 | B2 | 6/2003 | Ossipov et al. |
| 6,695,664 | B2 * | 2/2004 | Eden et al. ............... 445/24 |
| 6,737,668 | B2 * | 5/2004 | Den et al. .................. 257/9 |
| 7,642,720 | B2 | 1/2010 | Eden et al. |
| 8,404,558 | B2 * | 3/2013 | Eden et al. ............... 438/409 |
| 2003/0132693 | A1 | 7/2003 | Eden et al. |
| 2003/0203630 | A1 | 10/2003 | Geusic et al. |
| 2005/0136609 | A1 | 6/2005 | Mosley et al. |
| 2005/0148270 | A1 | 7/2005 | Eden et al. |
| 2006/0082319 | A1 | 4/2006 | Eden et al. |
| 2007/0170866 | A1 | 7/2007 | Eden et al. |
| 2011/0148282 | A1 | 6/2011 | Eden et al. |
| 2011/0260609 | A1 | 10/2011 | Eden et al. |
| 2011/0275272 | A1 | 11/2011 | Eden et al. |

FOREIGN PATENT DOCUMENTS

| | | |
|---|---|---|
| GB | 2 012 305 | 6/1982 |
| JP | 06-310103 | 11/1994 |
| WO | WO 2004/032176 | 4/2004 |
| WO | WO 2008/013820 | 1/2008 |

OTHER PUBLICATIONS

Park. S.J., et al., "P-90: Large Scale Arrays of Microcavity Plasma Devices Based on Encapsulated Al/$Al_2O_3$ Electrodes: Device Characteristics as a Plasma Display Pixel and Low Cost Wet Chemical Fabication Processing", *SID International Symposium,* 2007.

Park, S.-J., et al., "Nanoporous Alumina as a Dielectric for Microcavity Plasma Devices: Multilayer Al/$Al_2O_3$ Structures", *Applied Physics Letters,* 2005, vol. 86.

* cited by examiner

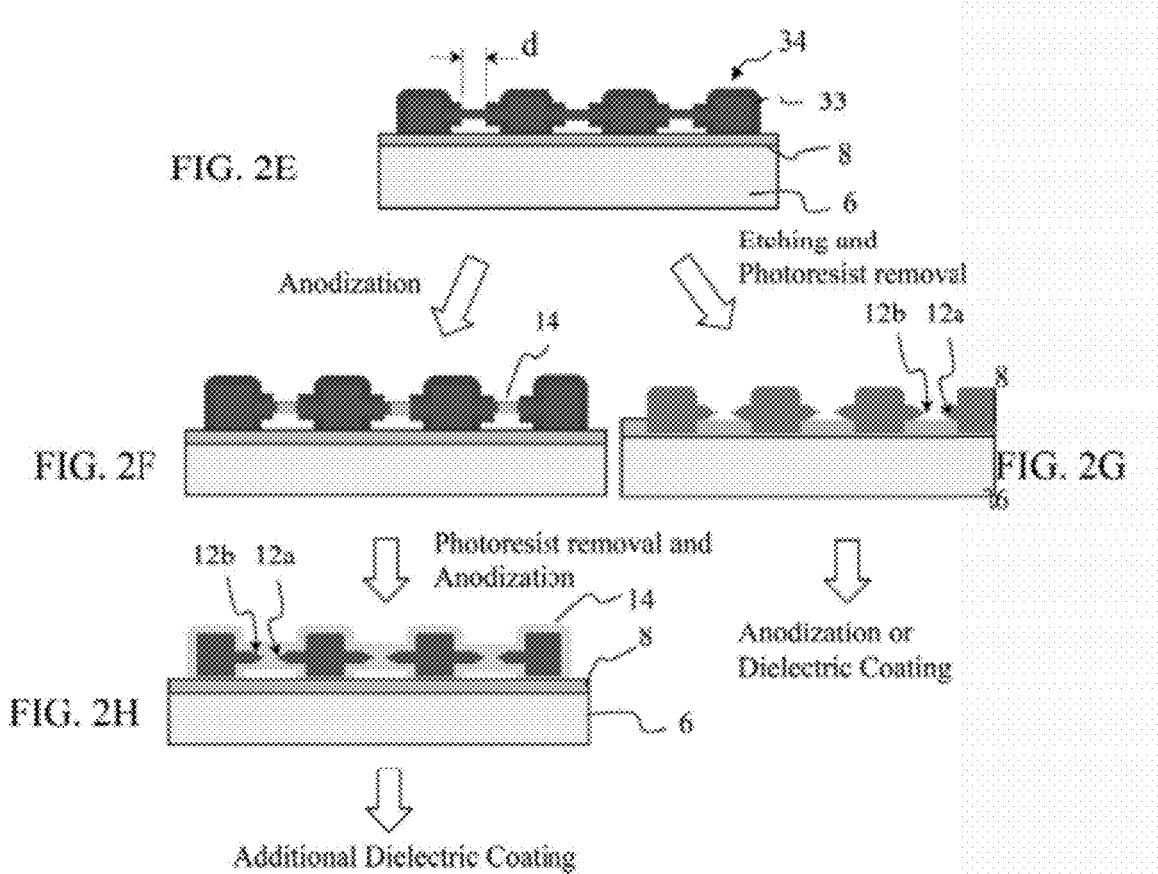

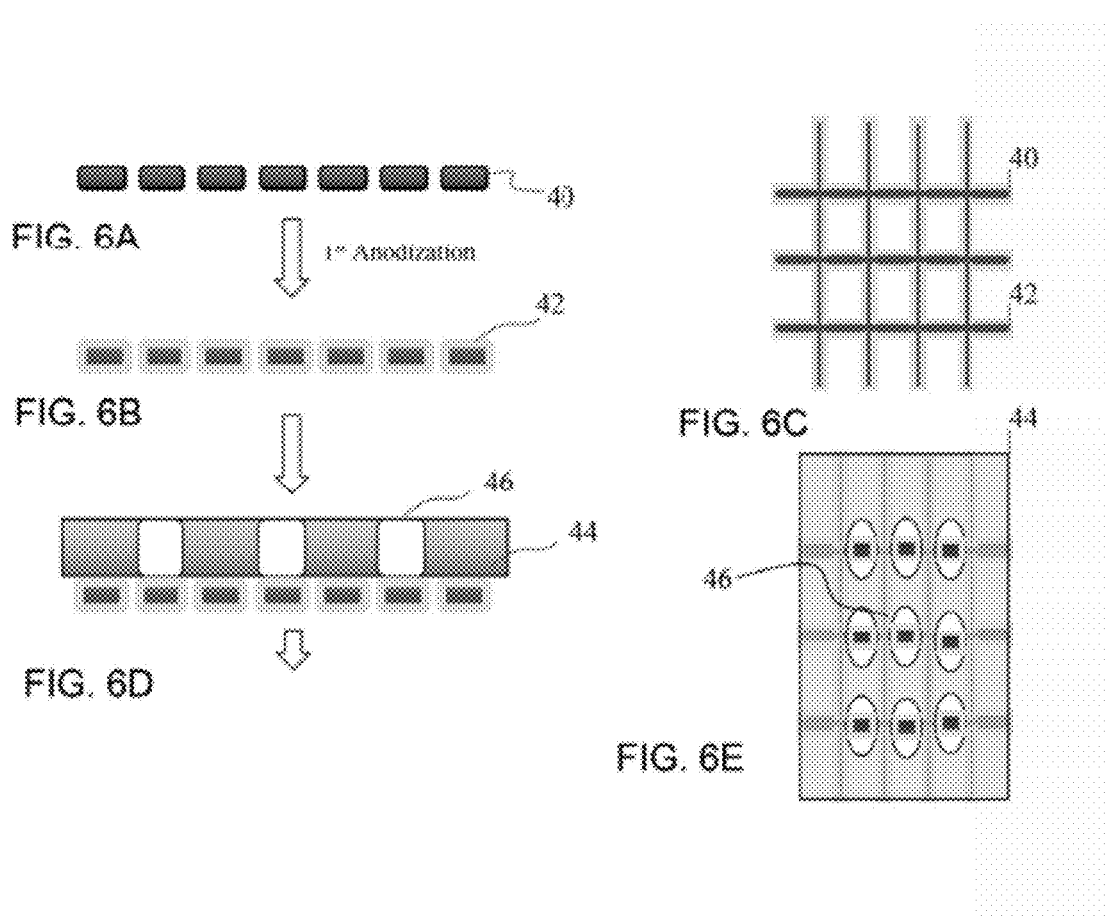

US 8,547,004 B2

ENCAPSULATED METAL MICROTIP MICROPLASMA DEVICES, ARRAYS AND FABRICATION METHODS

PRIORITY CLAIM AND REFERENCE TO RELATED APPLICATION

The application claims priority under 35 U.S.C. §119 from prior provisional application Ser. No. 61/367,951, which was filed on Jul. 27, 2010.

STATEMENT OF GOVERNMENT INTEREST

This invention was made with government support under Contract No. FA9550-07-1-003 awarded by the U.S. Air Force Office of Scientific Research. The government has certain rights in the invention.

FIELD

A field of the invention is microplasma devices and arrays, and metal and metal oxide-based microplasma devices and arrays, in particular. Devices and arrays of the invention have many applications, including, for example, displays and the plasma treatment processing of gases and liquids. Specific example applications include air and water purification, ozone production, the plasmachemical conversion of $CO_2$ into industrially-valuable feedstock gases, and the filtering of air.

BACKGROUND

Microplasma devices developed by the present inventors have been formed in various materials and configurations. Such devices are capable of igniting and sustaining glow discharges in microcavities having a characteristic dimension between approximately 5 μm and 500 μm. Electrodes are generally designed to ignite a plasma within each microcavity. Designs for the electrodes differ but most are azimuthally symmetric with respect to one or all cavity apertures. Prior arrays developed by the present inventors and colleagues have many applications, such as displays, lighting, as well as the production of ozone for water treatment.

For example, Park et al, U.S. Published Application Number 20100296978 discloses microchannel lasers having a microplasma gain medium. In that application, microplasma acts as a gain medium with the electrodes sustaining the plasma in the microchannel. Reflectors can be used in conjunction with the microchannel for obtaining optical feedback and lasing in the microplasma medium in devices of the invention for a wide range of atomic and molecular species. Several atomic and molecular gain media will produce sufficiently high gain coefficients that reflectors (mirrors) are not necessary. FIG. 4 of that application also discloses a microchemical reactor that is suitable for air purification and ozone production because of the channel lengths and large plasma power loadings (watts deposited per unit volume) that are available. However, fabrication costs associated with channels of extended length present an obstacle to commercialization for this technology for many applications that would benefit from ozone production.

Ozone is the strongest oxidant and disinfectant available commercially. Mechanisms of disinfection using ozone include direct oxidation/destruction of bacterial cell walls, reactions with radical by-products of ozone decomposition, and damage to the constituents of nucleic acids. Presently available commercial devices for the large scale production of ozone are generally expensive devices having high power requirements. Ozone is produced when oxygen ($O_2$) molecules are dissociated by an energy source into oxygen atoms. Collisions with oxygen molecules produce ozone ($O_3$), which must be generated at the point of treatment because the lifetime of $O_3$ in air at atmospheric pressure is in the order of minutes. Commercial ozone generators having sufficient capacity for municipal water treatment, for example, are large (as much as 10-15 ft. in length) and have demanding power requirements (150-200 kVA). Furthermore, the conversion of feedstock gases into $O_3$ is typically inefficient. Existing commercial processes for producing $O_3$ in large volume typically convert 15%-18% of the oxygen ($O_2$) feedstock gas into $O_3$. Maintenance of such system is also problematic owing to a large number of ceramic parts and fouling of device components by nitric acid. Inexpensive and compact devices for high-efficiency generation of ozone would have many important applications.

SUMMARY OF TUE INVENTION

An embodiment of the invention is a microtip microplasma device having a first metal microtip opposing a second metal microtip with a gap therebetween. The first and second metal microtips are encapsulated in metal oxide that electrically isolates and physically connects the first and second metal microtips. In preferred devices, the first and second metal microtips and metal oxide comprise a monolithic, unitary structure. Arrays of the microtip microplasma devices can be formed. In an array, the first metal microtip can be a portion of a first electrode and the second metal microtip a portion of a second electrode, with the first and second electrodes and said metal oxide defining a mesh with microscale openings therein. Arrays can be flexible, can be arranged in stacks, or formed into cylinders, for example, for gas and liquid processing devices, air filters and other applications.

A preferred method of forming an array of microtip microplasma devices provides a metal mesh with an array of micro openings therein. Electrode areas of the metal mesh are masked, leaving planned connecting metal oxide areas of the metal mesh unmasked. Planned connecting metal oxide areas are electrochemically etched to convert the planned connecting metal oxide areas to metal oxide that encapsulates opposing metal microtips therein. The mask is removed. The electrode areas are electrochemically etched to encapsulate the electrode areas in metal oxide.

BRIEF DESCRIPTION OF THE DRAWINGS

FIGS. 2A-2H illustrate a preferred method of the invention for fabricating arrays of opposed microtips mounted onto a porous substrate;

Figure 7:
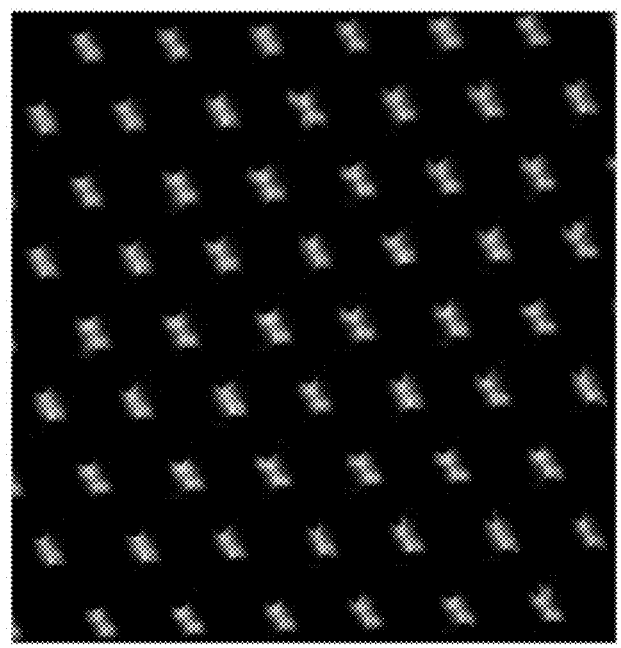
Figure 8:
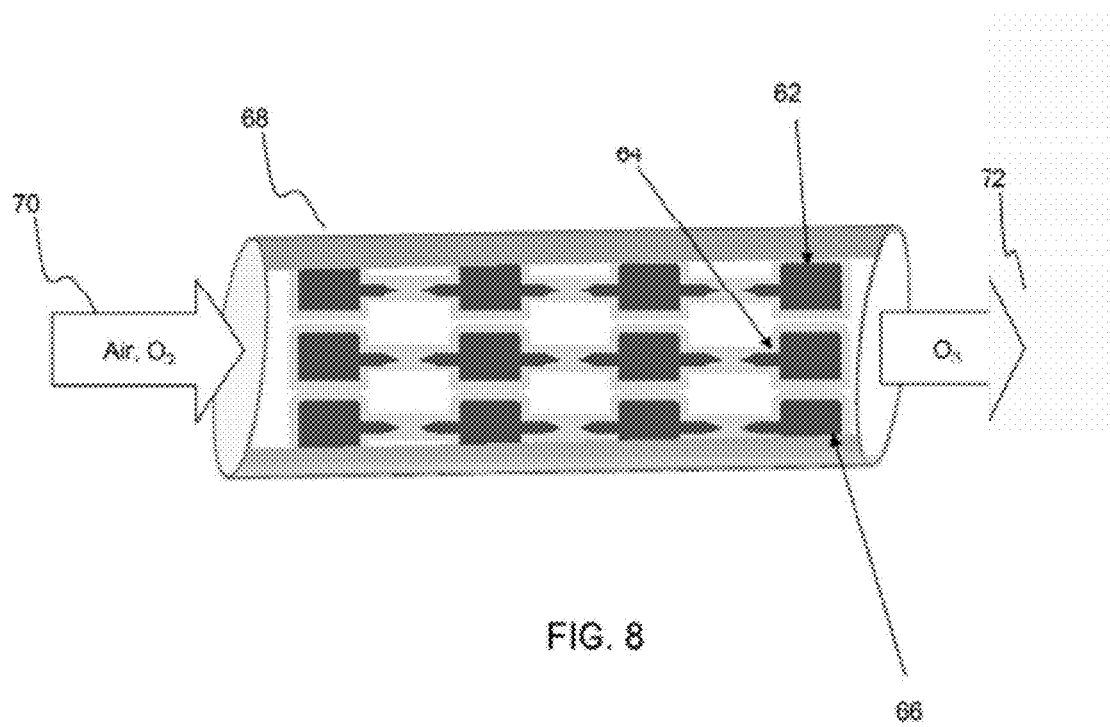
Figure 9:
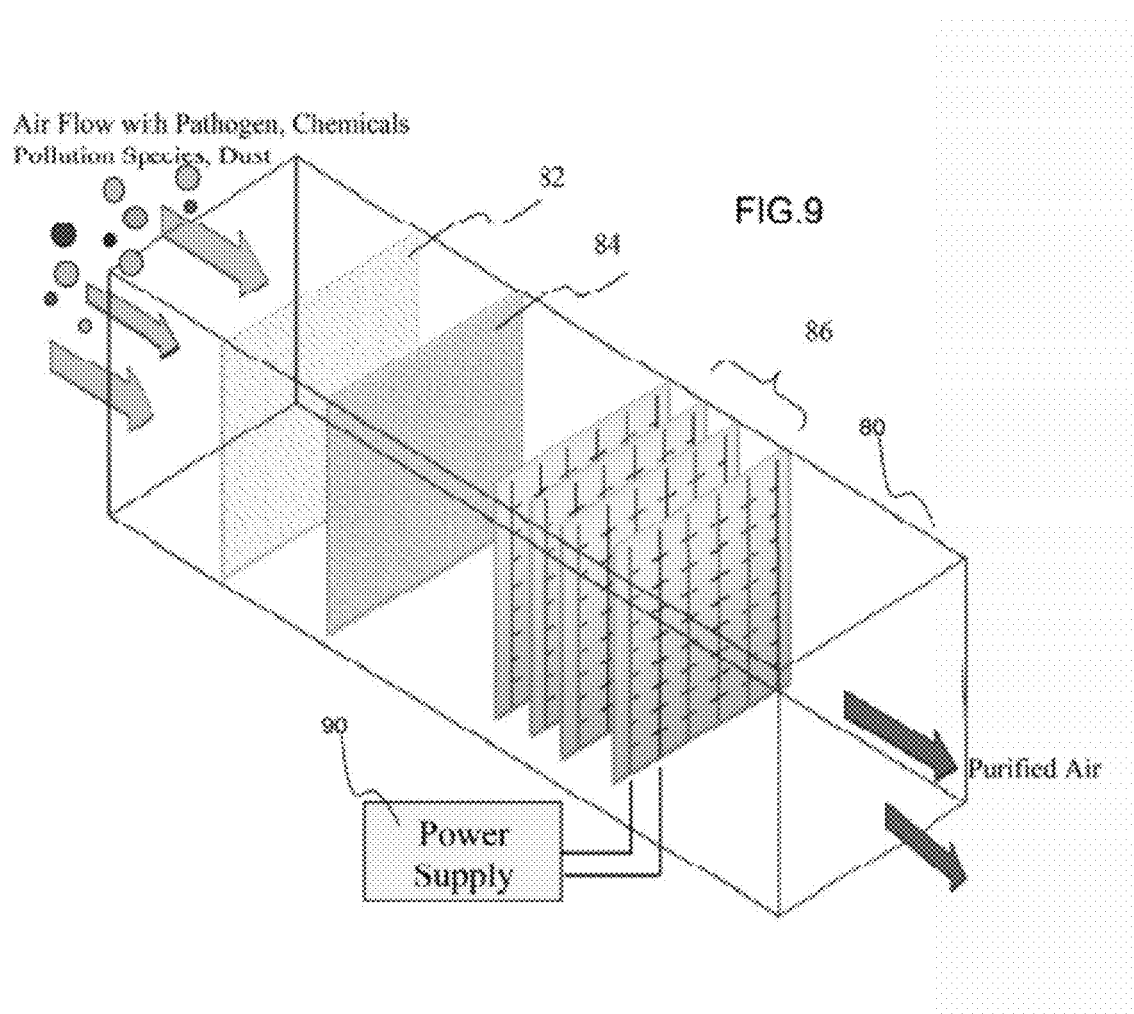
Figure 10:
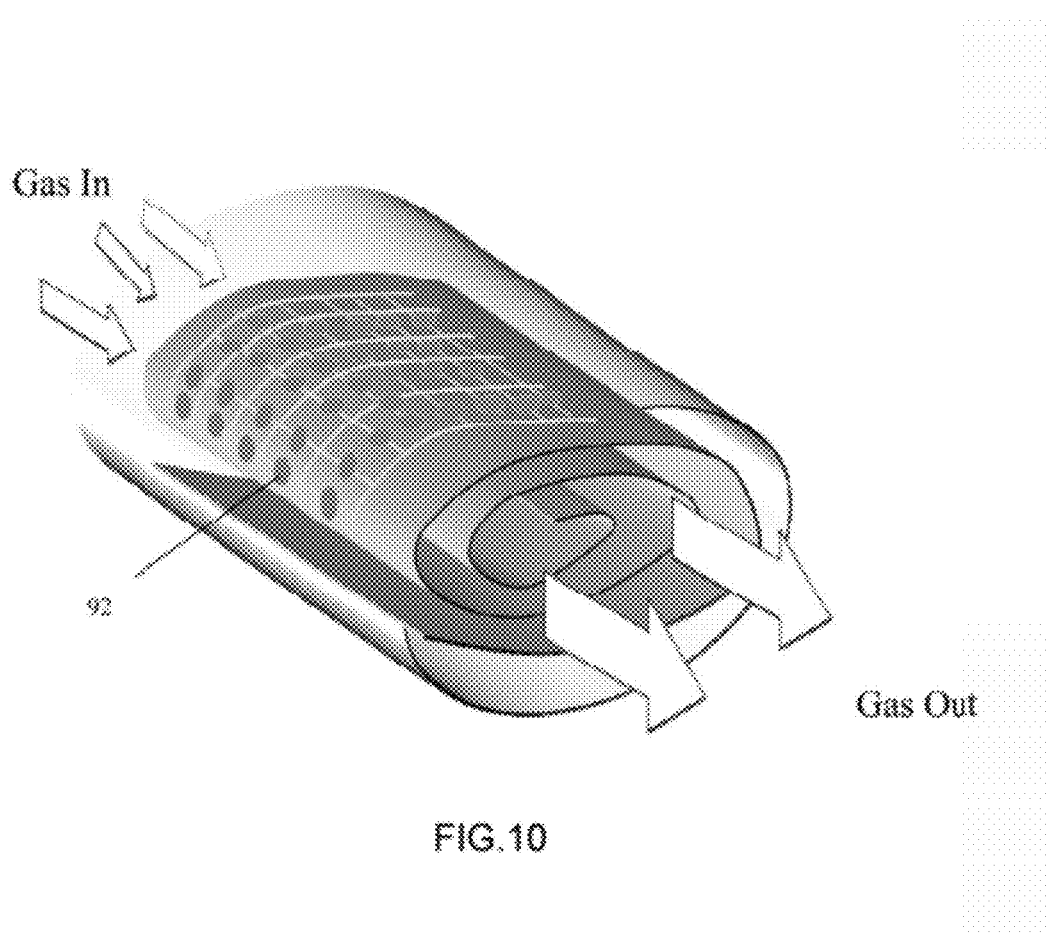
Figure 11:
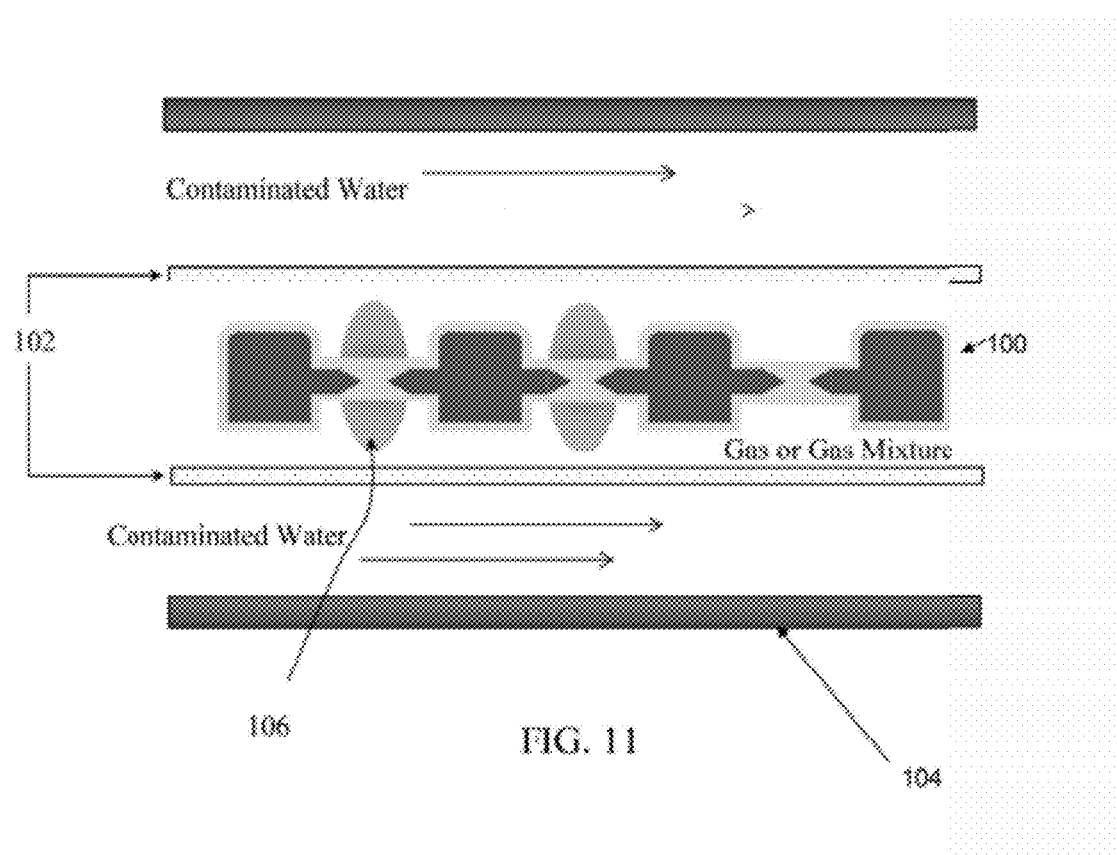

The inset to the figure presents a magnified view of the data at the point (shown by the dashed circle) at which an aluminum link in a mesh is chemically severed and a microtip pair is formed;

FIGS. 6A-6I is a sequence of diagrams illustrating a preferred embodiment method of the invention for forming arrays of microtip pairs of the invention;

FIG. 7 is a microphotograph of a portion of an array of microtip plasma devices of the invention producing microplasmas in neon gas;

FIG. 8 is a diagram of an array of microtip plasmas devices of the invention rolled into the form of a cylinder for the purpose of converting air or $O_2$ into ozone ($O_3$);

FIG. 9 illustrates a preferred device of the invention that purifies air by destroying biological and chemical pollutants with ozone generated by microtip plasma devices of the invention;

FIG. 10 illustrates another preferred device of the invention having arrays of microtip plasma devices of the invention that are rolled in the form of a scroll for the purpose of chemically altering one or more input gases so as to produce a product of industrial value; and FIG. 11 is a schematic cross-section device of the invention for the purification of water with ultraviolet light generated by a microtip plasma array of the invention immersed in a gas or mixture of gases.

DETAILED DESCRIPTION OF THE PREFERRED EMBODIMENTS

An embodiment of the invention is a microtip microplasma device having a first metal microtip opposing a second metal microtip with a gap therebetween. The first and second metal microtips are encapsulated in metal oxide that electrically isolates and physically connects the first and second metal microtips. In preferred devices, the first and second metal microtips and metal oxide comprise a monolithic, unitary structure. Arrays of the microtip microplasma devices can be formed. In an array, the first metal microtip can be a portion of a first electrode and the second metal microtip a portion of a second electrode, with the first and second electrodes and said metal oxide defining a mesh with microscale openings therein. Arrays can be flexible, can be arranged in stacks, or can be formed into cylinders, for example, for gas and liquid processing devices, air filters and other applications.

Embodiments of the invention include arrays of microtip plasma devices formed from opposing microtips encapsulated in dielectric, where each pair of microtips is capable of producing plasma in a gas or mixture of gases lying immediately adjacent to the encapsulating dielectric and in the vicinity of a microtip pair. Such an array of microplasmas can generate ultraviolet (UV) or vacuum ultraviolet (VUV) radiation capable of, for example, destroying pathogens in water and thus improving the purity of water in a municipal supply. Other applications for the microplasmas generated by microtips of the invention include the plasmachemical conversion of greenhouse gases or atmospheric pollutants into industrial feedstock gases or liquids.

A preferred method of forming an array of microtip microplasma devices provides a metal mesh with an array of micro (or mm-scale) openings therein. Electrode areas of the metal mesh are masked, leaving planned connecting metal oxide areas of the metal mesh unmasked. Planned connecting metal oxide areas are electrochemically etched to convert metal in these specific areas to metal oxide that physically connects and encapsulates opposing metal microtips therein. The mask is removed. The electrode areas are electrochemically etched to encapsulate the electrode areas in metal oxide. The dielectric gaps and encapsulated microtips have cross-sectional dimensions smaller than, but comparable to those of original mesh, but each opposing set of tips supports the generation and sustenance of intense plasma that can encircle each dielectric gap and microtip pair if space is left above and below the array.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale. The preferred embodiments are discussed with respect to experiments that were conducted with an aluminum and aluminum oxide based fabrication method. Another example system is titanium and titanium oxide.

Figure 1A:
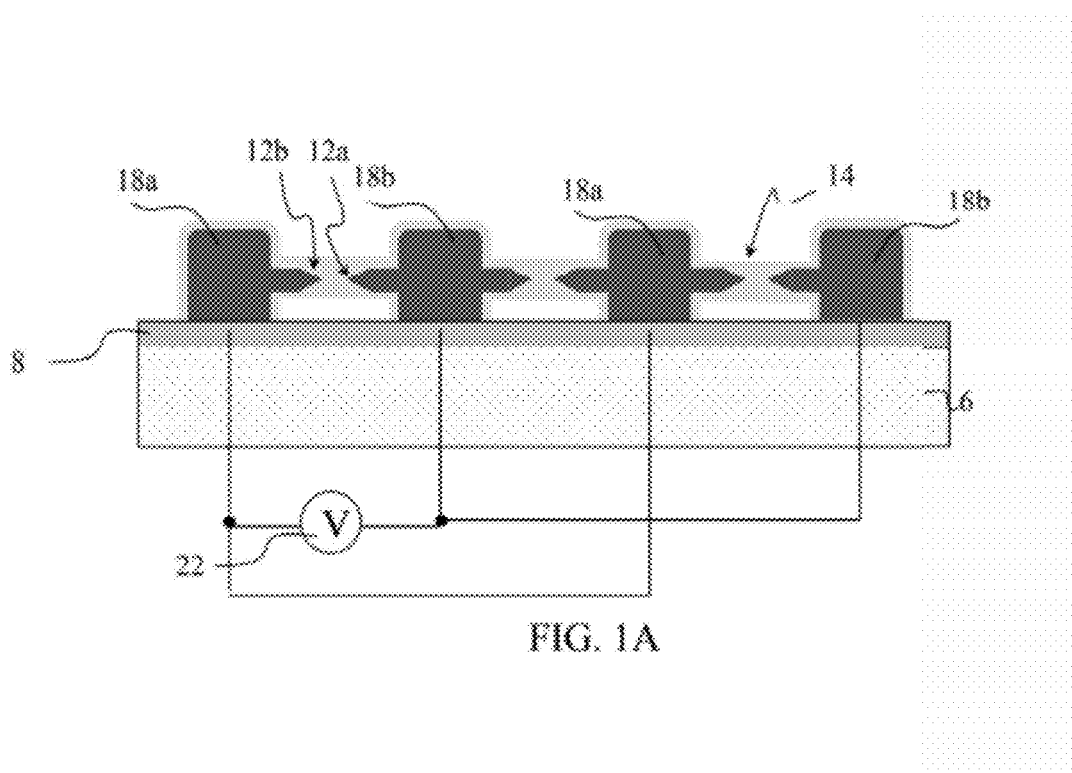
FIG. 1A is a schematic cross-section diagram of a portion of an array of microtip plasma devices of the invention mounted on a substrate.
Figure 1B:
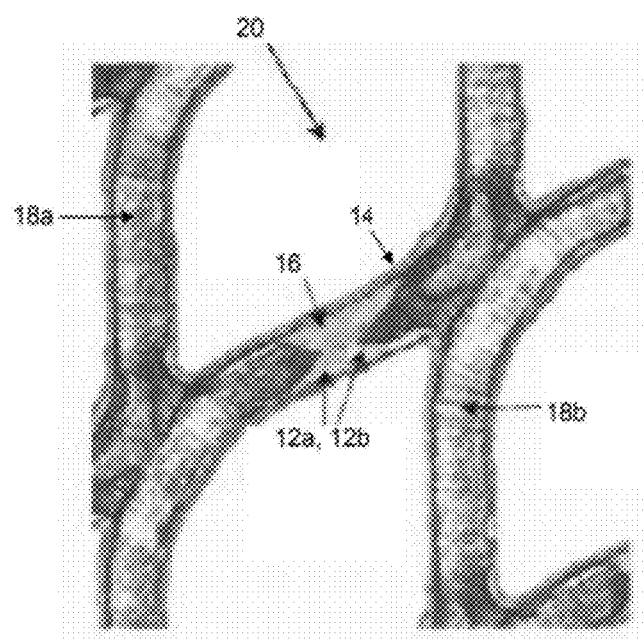
FIG. 1B is a photograph of a portion of an array of opposing microtips of the invention, showing a pair of microtips in an array of the invention formed from aluminum mesh and encapsulated in $Al_2O_3$.

FIGS. 1A and 1B illustrate preferred embodiment arrays of microtip plasma devices of the invention. FIG. 1A is schematic side view of an array mounted on a substrate 6 with an adhesive layer 8, and FIG. 1B is a photograph of an experimental array. The photograph of FIG. 1B was recorded by a CCD camera (coupled with a telescope) of a portion of an array of oxide-encapsulated microtip plasma devices of the invention fabricated from a metal mesh, such as an aluminum mesh.

The array shown in FIGS. 1A and FIG. 1B include a plurality of opposing microtip pairs 12a, 12b in a preferred embodiment microtip plasma array. The pair 12a, 12b is encapsulated by dielectric 14 that also fills/occupies a gap 16 that electrically separates the opposing pair while mechanically joining the pair 12a, 12b. Each tip has a respective electrode 18a, 18b that is shared by other microtip plasma devices in the array. The electrodes 18a, 18b are also coated with dielectric 14 to protect them from sputtering. The array in FIG. 1 is readily formed from a wire mesh that defines openings/cavities 20 that, with the dielectric 14 that occupies the gaps 16 serves to isolate the electrodes 18a, 18b from each other. The electrodes 18a and 18b continue in the vertical direction in FIG. 1A to provide the necessary alternating voltage for a plurality of the microtip pairs in the array, each of which ignites and sustains and intense plasma that surrounds each pair of microtips and associated dielectric gap.

The array of microtips can be mounted onto the substrate 6 with an adhesive layer 8 as shown in FIG. 1A, which can be any of a variety of materials including polymers or glass fit. Alternatively, arrays can operate without attachment to a substrate, and even in standard atmosphere as a result of intense electric fields that can be produced. The substrate 6 can preferably be porous, having a pattern of holes extending through the substrate to allow for the passage of a gas or liquid through the substrate. Each microtip pair 12a, 12b is excited electrically through the electrodes 18a, 18b by a time-varying (sinusoidal, RF, pulsed, etc.) voltage applied by the voltage source 22. The strong electric field produced in the region between the tips 12a, 12b and in the region outside the metal oxide that connects and covers the tips will produce a microplasma in this region if the peak value of the driving voltage is sufficiently high and a gas is present.

As demonstrated in experiments, microtips 12a, 12b are formed and are shaped electrochemically from the metal that constituted the original metal mesh. The mesh can be fabricated from a metal sheet or can be obtained from a commercial source. Such meshes are available in a wide variety of thicknesses and patterns having different geometries of openings 20, and such a commercial aluminum mesh was used to fabricate the array that is shown in FIG. 1B. The microtip pair 12a, 12b of FIG. 1B is separated by a specified and well-controlled distance. Both metal microtips 12a, 12b are encapsulated in metal oxide 14 that electrically isolates and physically connects the first and second metal microtips 12a, 12b. They form part of a larger unitary, monolithic structure that is a larger array with the electrodes 18a, 18b and dielectric 14 physically forming the unitary, monolithic structure. The opposing microtips 12a and 12b, as well as the entire array, are formed by converting metal, e.g., aluminum, into metal oxide, e.g., aluminum oxide on a spatially selective basis. As a result, the two tips 12a, 12b are completely encapsulated in metal oxide, which also forms a physical link portion that retains the original external shape of a wire mesh that was used to form the array.

Experimental microtip microplasma devices and arrays of the invention include pairs of aluminum microtips separated by a specified and well-controlled distance with typical values of tens to several hundred μm. The tips 12a, 12b are formed within the connecting links of which an aluminum mesh is composed. When the microtip pairs are formed, they are simultaneously encapsulated in nanoporous aluminum oxide (alumina). Applying a time-varying voltage to the metal mesh via a voltage source 22 (FIG. 1A) results in the generation of an array of small glow discharges produced above (indeed, around) the gap between each microtip pair but in the gas surrounding the mesh.

Experiments demonstrated inexpensive arrays of microplasma-generating electrode pairs with the microtip structure, allowing for the electric field strength at which the plasma is generated to be readily increased up to the breakdown strength of nanoporous alumina while simultaneously allowing for the openness or transparency of the mesh to be large. The intense electric fields achievable with microtips make arrays of microtip pairs well-suited for generating microplasmas in attaching gases and other gases (such as $CO_2$) that are difficult to dissociate (fragment) efficiently. Large, two dimensional arrays can be formed. Each microtip is separated from its opposing partner by a fixed distance (typically in the range of 10-700 μm) and all of the aluminum (from which the microtips are formed), or just the microtips themselves, are encapsulated by a dielectric layer such as alumina ($Al_2O_3$).

Figure 2A:
Figure 2B:
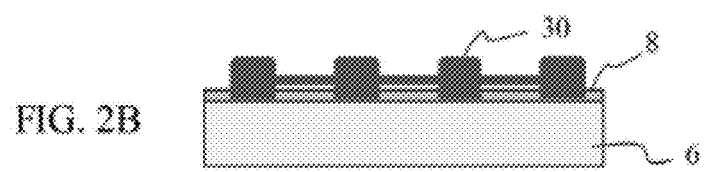
Figure 2C:
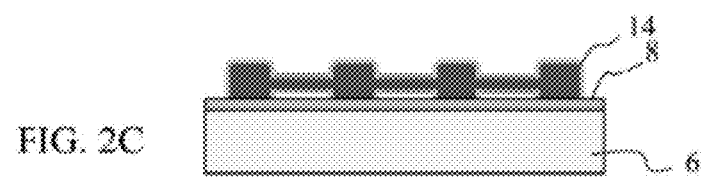
Figure 2D:

FIGS. 2A-2H is a sequence of cross-sectional diagrams that shows a preferred method for forming the microtip arrays of FIGS. 1A and 1B. The process begins (FIG. 2A) with a substrate 6 that can be porous in the sense that holes or slots (not shown in FIG. 2A) are provided that will allow a gas or liquid to pass through the substrate 6 in the direction that is normal to the surface of the substrate. The substrate 6 is nonporous in other embodiments. In FIG. 2B, a metal mesh 30, such as an aluminum mesh is affixed to the substrate 6 via adhesive 8. The metal mesh 30 has a regular pattern of metal links or interconnects with openings therebetween. The mesh can have a uniform or variable thickness, the latter of which is shown in FIG. 2 The adhesive 8 can be, for example, a polymer if the substrate 6 is also a polymer whereas if the substrate is glass or ceramic, the optimal adhesive may be a glass frit. Once the mesh 30 is mounted onto the substrate 6, anodizing the exposed metal, e.g., Al mesh by wet chemical processing in, for example, oxalic acid produce a thin encapsulating layer of alumina ($Al_2O_3$) 14 as shown in FIG. 2C. A typical thickness for this initial encapsulation layer is ~1 μm. In FIG. 2D, the entire mesh is coated with photoresist 31 and the selective removal of photoresist 33 in FIG. 2E by photolithography forms a mask 34 that includes exposed areas of the mesh 30 having a length d, which distance sets the desired gap between the microtips that will be formed. Also, the areas selected for removal of the photoresist are generally those in which a dielectric linkage (14 in FIG. 1B) in the mesh pattern will lie. FIGS. 2F and 2G illustrate alternatives. In FIG. 2F, the next process entails partially or fully converting the metal, having the length d, into metal oxide (e.g., $Al_2O_3$) 14. Subsequently (FIG. 2H), the photoresist mask 34 is removed and continued anodization of the now entirely-exposed structure culminates in the formation of the microtips 12a and 12b and the encapsulation of all metal, e.g., Al in metal oxide, $Al_2O_3$.

The alternative route of FIG. 2G is to first etch the exposed Al links to form the microtips 12a, 12b, and subsequently, remove the photoresist. The process sequence, in either case as illustrated in FIG. 2H, concludes with one or both of anodizing the Al microtip pair array to complete dielectric formation or by coating the array with a dielectric other than $Al_2O_3$. The latter can be accomplished by any of a variety of well-known techniques such as evaporation or sputtering. The formed array can also be removed from the substrate 6 by dissolution or another method for removing the adhesive 8

Figures 3A, 3B, 3C:
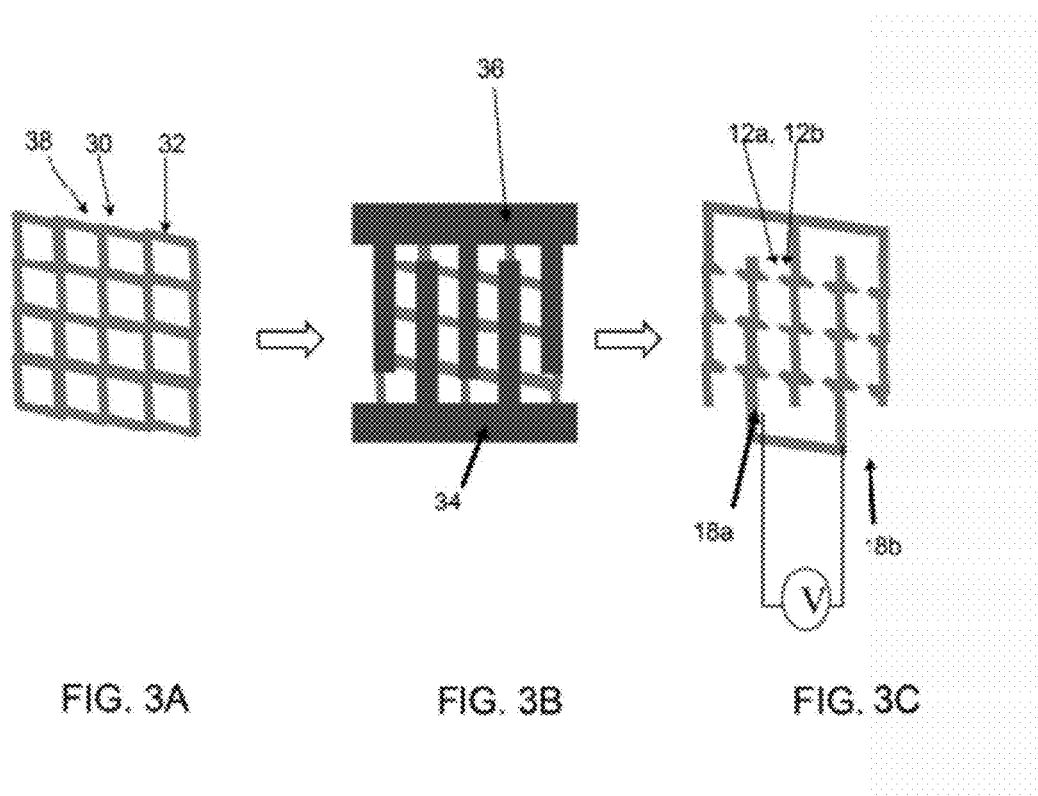
FIGS. 3A-3C illustrate in plan view a preferred method for forming arrays of microtip plasma devices of the invention encapsulated in a metal oxide.

FIG. 3 illustrates a method of formation. For simplicity and clarity of presentation, the metal structure (mesh or patterned foil) is shown without the oxide that encases it and "links" the metal microtips. In FIG. 3A, the process begins with a mesh or patterned foil 30 having links 38 between electrodes 32. As discussed earlier, a substrate provides mechanical support to the metal mesh but the mesh need not, for several applications of this invention, be permanently attached to the substrate. FIG. 3B illustrates the application of photoresist 34 to the mesh in a pattern determined by the appropriate mask pattern. Subsequent chemical processing (etching and/or anodization) of the mesh produces (FIG. 3C) pairs of microtips 12a, 12b and two electrodes 18a, 18b. One microtip for each pair in the array is electrically and physically connected to one of the two electrodes (first electrode) while the other microtip in each pair is connected to the second electrode. An attractive aspect of the fabrication sequence is that only one photolithographic step is required to form the mask and the necessary spatial resolution is quite low compared to the size of the tips that results, thus reducing the cost for the fabrication process. In addition, the degree of etching (i.e. length of time devoted to FIG. 2G or 2H) controls the gap between the tips and determines the tip profile (as does the cross-section of the mesh that is initially used to form the array)

Figures 4A, 4B:
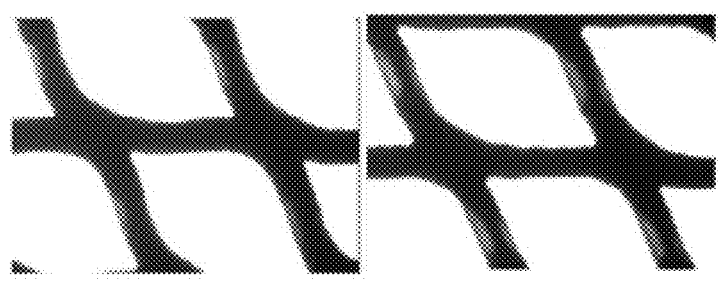
FIGS. 4A-4D are photographs showing four stages in the formation of opposing microtips from an aluminum mesh.
Figures 4C, 4D:
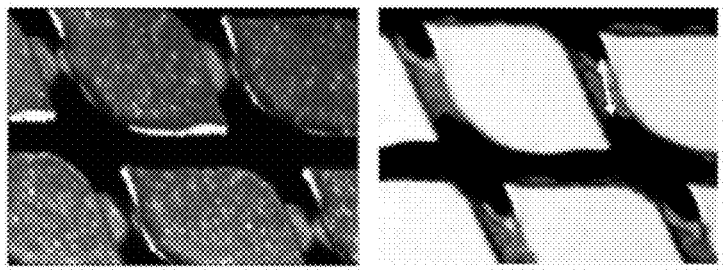

The control with which the microtip shape (profile) and the gap between the microtips can be specified is extraordinary. FIG. 4 is a sequence of four microphotographs showing the transformation of portions of an Al mesh into $Al_2O_3$, forming microtips in the process of FIG. 2H. In FIG. 4A, the process of the tip formation has just begun as only ~25% of the width of Al link has been converted into Al2O3. The arrow in FIG. 4A identifies one of the links at which the conversion process is underway. In FIG. 4B, the process is more than 50% complete and, in FIG. 4C, the growth of $Al_2O_3$ is on the verge of severing the Al link. Continuing to convert Al into $Al_2O_3$ (FIG. 4D) widens the gap between the newly-formed microtips to ~230 μm.

Figure 5:
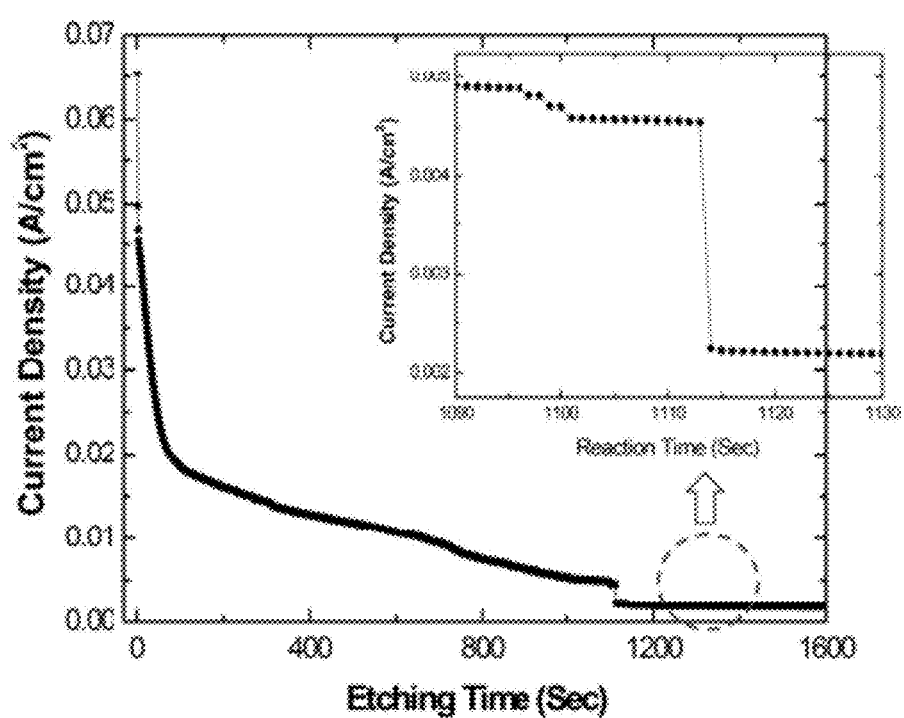
FIG. 5 is a graph of the dependence of current density on etching time for the anodization process (Step VI) of FIG. 2.

Tests show that the reproducible formation of microtip pairs having a specific profile and gap can be accomplished by monitoring current flow during the anodization process (FIG. 2G or 2H). Because the mesh structure serves as an electrode during anodization, the current can be recorded throughout the process, as shown by the representative trace in FIG. 5. At the point when the Al links are severed, the current drops precipitously (see also the inset to FIG. 5). Consequently, recording the current during anodization eliminates the need for periodically removing the mesh from the anodization bath and visually determining the progress of the Al-to-$Al_2O_3$ conversion process. Continuing the anodization process a predetermined amount of time beyond the "break point" of FIG. 5 results in an array of microtips having gaps that are virtually constant over the entire array. In other words, the rate of increase of the microtip gaps (beyond the breakpoint) was calibrated for specific anodization bath concentrations and temperatures. In this way, the microtip pair gap and profile can be controlled precisely.

Figure 6F:
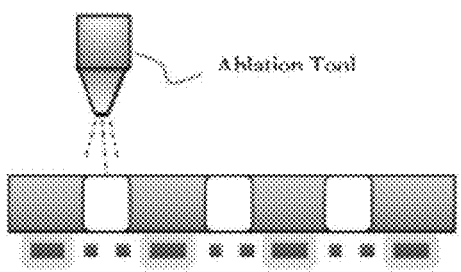
Figure 6H:
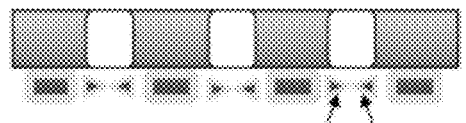
Figure 6G:
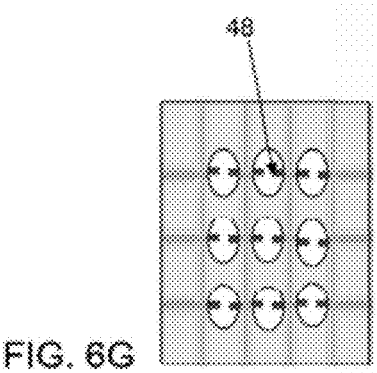
Figure 6I:
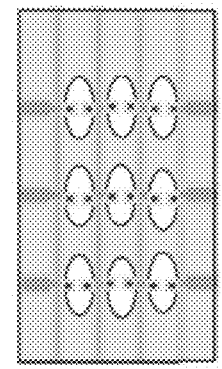

FIGS. 6A-6I illustrate another embodiment method for forming arrays of the invention that avoids a photolithographic step. The process begins (FIG. 6A) with metal, e.g., Al mesh 40, or a patterned foil that is anodized so as to encapsulate the mesh with a layer of nanoporous $Al_2O_3$ (FIGS. 6B and 6C). In FIGS. 6D and 6E, the anodized mesh is affixed to a support pad or substrate 44 having openings 46 (through holes or slots) that are partially or fully aligned with portions of the mesh. With an ablation process such as micro- or nano-powder blasting in FIGS. 6F and 6G, a portion of the "links" in the mesh are removed to form gaps 48, after which anodization as described in FIGS. 2 and 3 will form opposing, encapsulated microtips 50a, 50b in FIGS. 6H and 6I.

For arrays of the invention, the electrodes and interconnects are sealed or encapsulated in nanoporous metal oxide. Advantageously, arrays can be produced from a single sheet of commercially-available metal mesh with a fabrication procedure that requires only one photolithographic step (or, as shown in FIG. 6, not at all). The entire electrical structure, including the microgaps, is encapsulated, making these arrays extremely robust. Microplasmas are formed outside, but immediately above and behind, the microgaps in the gas in which the array is immersed due to the intense electric field. The electric field strength in each microgap is readily controlled by varying gap length and tests show that arrays of microtip pairs operate well in the most challenging gases, including air. It should also be noted that this design does not require microplasma to be formed in the openings/microcavities in the mesh.

FIG. 7 a microphotograph of a portion of an array of microplasmas produced when an array of microtip pairs is immersed in 400 Torr of Ne and a 20 kHz, 283 V RMS sinusoidal voltage is applied to the two electrodes as illustrated in FIGS. 1A and 3C. Applying a voltage to the electrodes generates an intense electric field between the two tips of every gap in the array. The strength of this electric field is greatest in the region between the tips but because this region is filled with metal oxide, a discharge does not occur there. Instead, plasma is produced around the outside of the oxide "links" that fill the microgaps between microtips.

FIGS. 8-11 illustrate several representative applications of the microtip arrays. If the substrate of FIG. 2 is removed after processing or, alternatively the substrate is thin and flexible, then the array can be formed into a cylinder or several concentric cylinders. As shown in FIG. 8, such a structure can be used to convert air or $O_2$ ozone. In FIG. 8, multiple microtip arrays 62, 64 1.0 and 66 are enclosed in a vessel 68. A gas flow 70 including oxygen is through the vessel 68 and ozone 72 is created by the strong plasmas generated around microtips in the arrays and exits the vessel. While the flow is in the horizontal direction, in other embodiments, the flow is vertical. The produced ozone can be used for many purposes, including, for example, the treatment of water, waste water, air, etc., for the purpose of purification, disinfection and elimination or neutralization of contaminants including bacteria.

Since the microtip pairs also operate well in air, arrays of microtips can also be used to purify air as shown schematically in an air purifier of FIG. 9. An airflow to be treated enters an enclosure 80 Conventional air filters such as a pre-dust filter 82 and a HEPA filter 84, which physically remove particles from the air flow stream but are incapable of destroying pathogens (such as MRSA) or spores. Single or multiple spaced arrays of microtip plasma devices 86 are in the enclosure 80 (which can be a duct, for example in a hospital ventilation system, and are power by a power supply 90. The arrays 86 can be quite effective in destroying pathogens and can be replaceable modules like the filters. The combined effect of the UV radiation emitted by the plasma and the plasma itself will destroy contaminants and pathogens to a degree considerably higher than that afforded by existing systems.

FIG. 10 illustrates a system in which an array 92 of microtip plasma devices formed in a roll shape can be used to convert greenhouse or environmentally hazardous gases into feedstock gases (or liquids) of commercial value. The device of FIG. 10 can be powered and in an enclosure as illustrated in FIG. 9, but the array in a roll form in FIG. 10 is shown alone for simplicity of illustration. One example application is the conversion of CO, into ethanol or formic acid by mixing CO, with water vapor and exposing the mixture to the plasma array. Alternatively, $CO_2$ alone may be introduced to the input of the array and water vapor added downstream. Although FIG. 10 shows a scroll-type configuration for the microplasma array, other geometries (such as concentric cylinders) are also acceptable.

In FIG. 11, a schematic diagram showing a system of the invention that is for the treatment of contaminated is presented which shows the treatment of contaminated water by ultraviolet radiation produced by an array of microplasmas in an appropriate gas such as one or more of the rare gases. Ultraviolet radiation of the proper wavelength (normally UV-C) is known to be effective in destroying biological contaminants in water. An array 100 of microtip plasma devices is enclosed in a UV transparent material 102 within a flow enclosure 104, such as a pipe. UV emissions generated 106 treat the water flowing in the pipe 106. Additionally, gas flows can route produced ozone through the water for treatment of the water with ozone.

The preferred embodiments have been shown to provide arrays of opposing microtips encapsulated in dielectric, each pair of microtips capable of producing plasma in a gas or mixture of gases lying immediately adjacent to the encapsulating dielectric and in the vicinity of a microtip pair. Such an array of microplasmas can generate ultraviolet (UV) or vacuum ultraviolet (VU) radiation capable of, for example, destroying pathogens in water and thus improving the purity of water in a municipal supply. Other applications for the microplasmas generated by microtips of the invention include the ozone production from oxygen or air, and the plasma-chemical conversion of greenhouse gases or atmospheric pollutants into industrial feedstock gases or liquids. Microtip arrays of the invention are particularly well-suited for filters capable of destroying pathogens (such as MRSA), spores, and other contaminants in the air supply for critical environments, including surgical and patient rooms in hospitals and the homes of individuals with compromised immune system.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A microtip microplasma device comprising a first metal microtip opposing a second metal microtip with a gap therebetween, said first and second metal microtips being encapsulated in metal oxide that electrically isolates and physically connects the first and second metal microtips.

2. The device of claim 1, wherein the first and second metal microtips and metal oxide comprise a monolithic, unitary structure.

3. An array of micro tip microplasma devices, comprising a plurality of microtip microplasma devices according to claim 1, wherein said first metal microtip comprises a portion of a first electrode and said second metal microtip comprises a portion of a second electrode, said first and second electrodes and said metal oxide defining a mesh with microscale openings therein.

4. The array of claim 3, said first electrode and said second electrode comprise a single layer, monolithic, unitary structure.

5. The array of claim 4, further comprising one or more additional single, layer monolithic, unitary arrays of microtip microplasma devices.

6. The array of claim 3, wherein said first electrode and said second electrode are interdigitated.

7. The array of claim 6, wherein said first and second electrodes comprise aluminum and said oxide comprises aluminum oxide.

8. The array of claim 6, wherein said first and second electrodes comprise titanium and said oxide comprises titanium oxide.

9. The device of claim 1, wherein said first and second microtips comprise sharp tips.

10. The device of claim 1, wherein said first and second microtips comprise rounded tips.

11. The device of claim 1, wherein said gap is predetermined to achieve a desired electric field strength upon application of a time-varying voltage to said first and second microtips.

12. A purification device, the device comprising a plurality of devices according to claim 1 arranged with respect to each to successively encounter a medium to be filtered.

13. The device of claim 12, wherein the plurality of device according to claim 1 are arranged concentrically.

14. The device of claim 12, wherein the plurality of devices according to claim 1 are arranged in a flat stack.

15. A microtip microplasma device comprising an array of first and second metal electrodes encapsulated in metal oxide, said first and second electrodes defining an array of opposing metal microtips being separated by connecting metal oxide.

16. The device of claim 15, wherein said first and second electrodes comprise a single layer.

17. The device of claim 16, wherein said first and second electrodes and said metal oxide comprise a monolithic, unitary structure.

18. The device of claim 17, further comprising one or more additional single layers monolithic, unitary microtip microplasma devices.

19. The device of claim 15, wherein said first electrode and said second electrode are interdigitated.

20. The device of claim 15, wherein said first and second electrodes comprise aluminum and said oxide comprises aluminum oxide.

21. The device of claim 15, wherein said first and second electrodes comprise titanium and said oxide comprises titanium oxide.

22. The device of claim 15, wherein the first and second metal electrodes are thin enough to make the array flexible.

* * * * *

UNITED STATES PATENT AND TRADEMARK OFFICE
CERTIFICATE OF CORRECTION

PATENT NO.         : 8,547,004 B2
APPLICATION NO.    : 13/188715
DATED              : October 1, 2013
INVENTOR(S)        : Eden et al.

Page 1 of 1

It is certified that error appears in the above-identified patent and that said Letters Patent is hereby corrected as shown below:

On the Title Page:

(57) Abstract

Page 1, Right Col., Line 35    After "preferred method of", please delete "to".

Signed and Sealed this
Twentieth Day of May, 2014

Michelle K. Lee
*Deputy Director of the United States Patent and Trademark Office*